April 23, 1935. F. M. YOUNG ET AL 1,998,916
ELECTRIC HEATING DEVICE
Filed Jan. 25, 1933 2 Sheets-Sheet 1
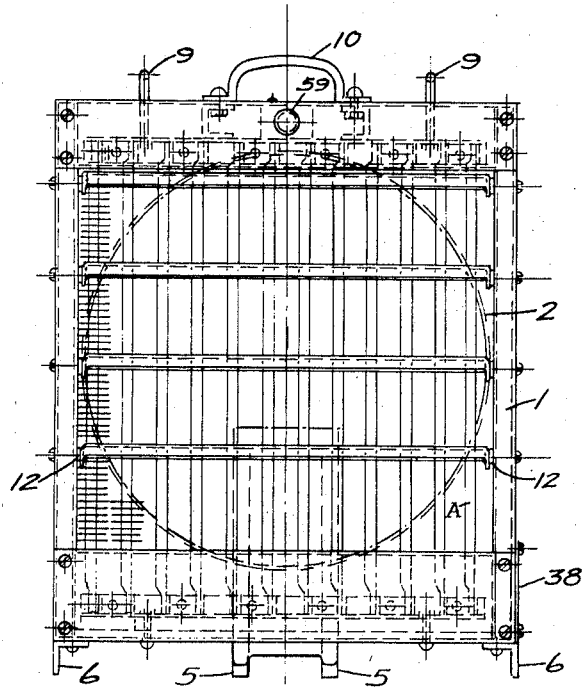
Fig. 1
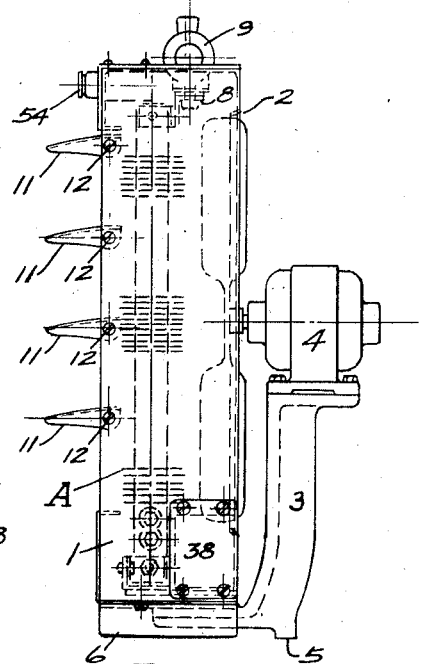
Fig. 2
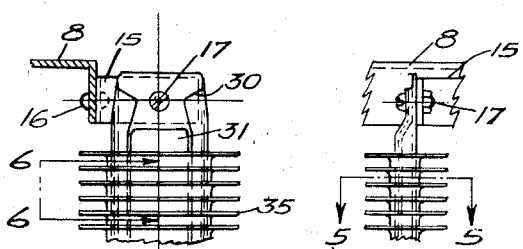
Fig. 4 Fig. 3
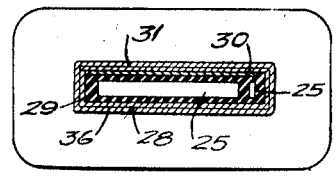
Fig. 5
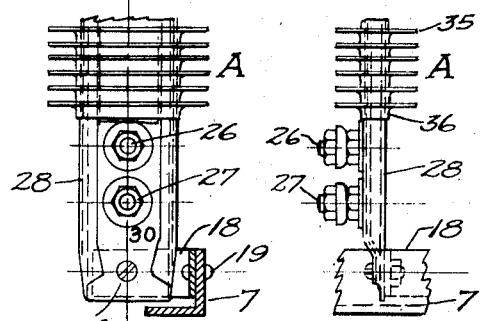
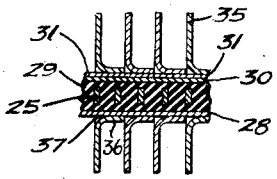
Fig. 6
Inventors
Fred M Young
Ernst Witzel
By Attorney
A S Krotz April 23, 1935.  F. M. YOUNG ET AL  1,998,916
ELECTRIC HEATING DEVICE
Filed Jan. 25, 1933   2 Sheets-Sheet 2
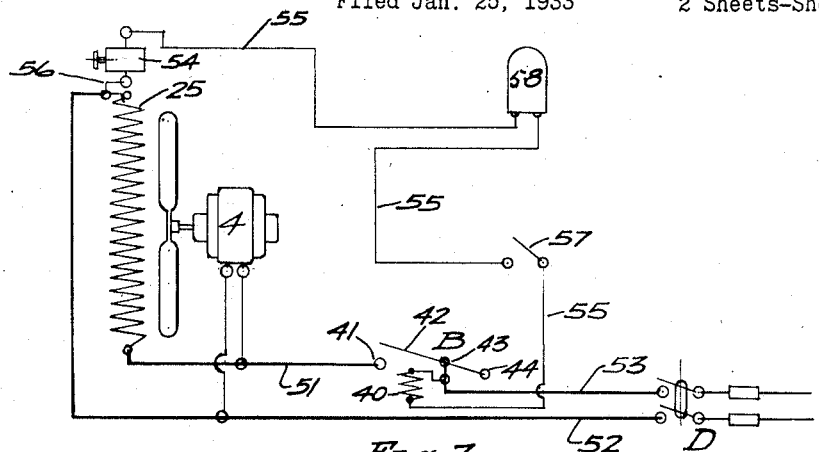
Fig. 7
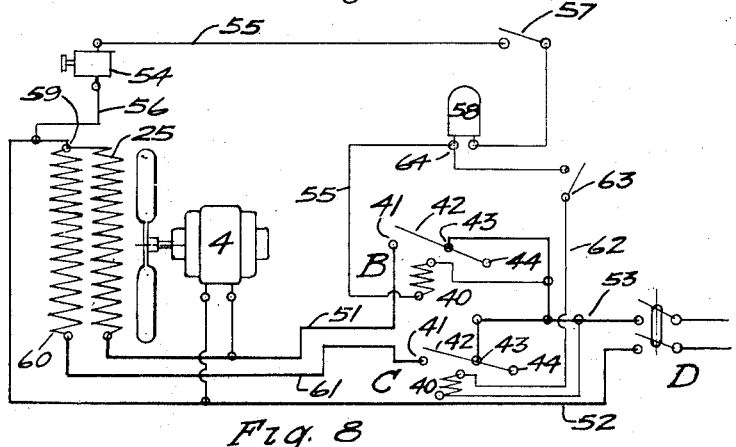
Fig. 8
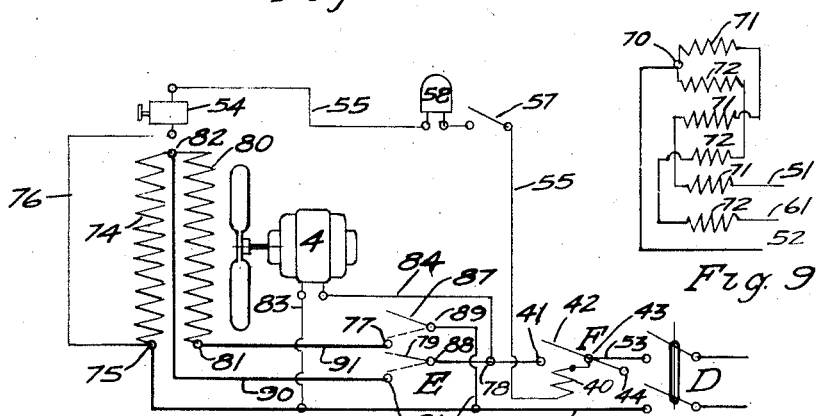
Fig. 10
Fig. 9
Inventors.
Ford M. Young
Ernst Witzel
By Attorney
A S Krotz Patented Apr. 23, 1935

1,998,916

UNITED STATES PATENT OFFICE 1,998,916

ELECTRIC HEATING DEVICE

Fred M. Young and Ernst Witzel, Racine, Wis.; said Witzel assignor to Young Radiator Company, Racine, Wis., a corporation of Wisconsin Application January 25, 1933, Serial No. 653,396

8 Claims. (Cl. 219—39)

Our invention relates to improvements in electric heating systems whereby the electric current is efficiently used for heating purposes and whereby the electric current is controlled manually or automatically by direct or remote control.

It is the intention that the present patent shall cover, by suitable claims, features other than claimed in our co-pending divisional application signed by us this 30th day of January, 1935, entitled "Electric heating units".

One of the objects of our invention is to position novel heating elements in a row across the air outlet of a unit housing, the elements comprising rectangular tubes having resisters therein, and a multiplicity of suitable fins through which the tubes extend, the tubes being positioned with their wide sides longitudinal to the direction of air flow and the fin edges in juxtaposition.

A further object of our invention is to provide a thermal control in the heating unit whereby the electric current will be automatically disconnected in case the electric fan should fail to operate or the temperature of the elements raise abnormally from other cause, thus to protect the heating elements against injury.

A further object of our invention is to provide a main line switch and means to operate the same by remote or direct control either thermally or manually.

A further object of our invention is to provide an electric heating unit having resisters adapted to be divided into two or more sections wherein one or more sections may be disconnected and reconnected manually or automatically by remote or direct control.

Another object of our invention is to provide an electric heating unit wherein a neat and novel housing is adapted to enclose and support an electric fan, having electric air directing means, a junction box, a thermal switch and means for supporting and transporting the unit.

To these and other useful ends this invention consists in matter hereinafter set forth and claimed and shown in the accompanying drawings in which:

Fig. 1 is a front elevation of the heating unit.

Fig. 2 is a side elevation of the unit as shown in Fig. 1.

Fig. 3 is an enlarged fractional front view of one of the heating elements, illustrating the method of fastening the supports.

Fig. 4 is a fractional side view of the elements as shown in Fig. 3, illustrating the supports in section and showing the method of attaching the elements thereto.

Fig. 5 is a sectional view taken on line 5 of Fig. 3.

Fig. 6 is a sectional view taken on line 6 of Fig. 4.

Fig. 7 is a diagrammatic drawing illustrating the electric circuits of one form of our heating unit and control device.

Fig. 8 is a diagrammatic drawing illustrating the circuits of another form of our heating system wherein the heating elements are divided into two sections.

Fig. 9 is a diagrammatic view illustrating a resister plan suitable for the switch and circuit scheme shown in Fig. 8.

Fig. 10 is a diagrammatic view showing a manual control switch whereby the heating elements may be connected in multiple and in series.

As thus illustrated, our invention consists of a novel heating unit and automatic current control devices which cooperate to produce a novel, efficient system and wherein the switches and controlling means may be manually operated by remote control and the heat in the unit or room controlled electrically and automatically in a manner which will hereinafter appear.

Referring now to the various figures, the reference numeral 1 designates the heating unit housing having a fan blade opening in the rear which is circular as at 2 and illustrated in Fig. 1 by dotted lines. A bracket 3 is attached to the bottom of the housing and in the center thereof transverse to the housing. This bracket extends rearwardly and upwardly to thereby provide a support for an electric motor 4. The bracket 3 is provided with rests 5 5, thus to provide a rear support for the unit to prevent tipping over when setting on the floor or on a shelf. The angle plates 6 6 act as end supports for the unit and a rigid base piece for the housing to which the cross element supporting angle bar 7 is attached at its ends. A similar angle bar 8 acts as a support for the top ends of the elements and to which the eye-bolts 9 9 and handle 10 are attached. The handle 10 provides means by which the unit may be carried manually. The eye-bolts 9 serve as a means whereby the unit may be suspended from the ceiling by means of chains, wires or ropes.

The front of the housing frame is narrow, leaving a large square or rectangular opening from which the heated air is discharged. It is frequently necessary in practice to direct the heated air downward and for this purpose the deflector blades 11 are provided, having pivotal friction supports as at 12, whereby these blades may be moved manually to different angles.

The heating elements are designated in their entirety by the reference character A. These elements are located in the front of housing 1 in a row transverse to the housing and in parallel relation and closely spaced as indicated in Fig. 1, having their wide sides positioned longitudinally to the direction of air flow. The upper ends are secured to angle bar 8 by means of angle bracket 15; these brackets are attached to bar 8 by means of rivets 16 and the element A is attached to the bracket 15 by means of bolt 17.

The lower ends of elements A are attached to angle bar 7 by means of brackets 18 as indicated in Figure 4.

The elements A consist of a unit assembly comprising a resister 25 which is made preferably in the form of a ribbon or flat wire of suitable material, suitably formed to thereby greatly increase its length, the ends of which are attached to terminal bolts 26 and 27.

The enclosure 28 is preferably rectangular in shape and is adapted to enclose the resister 25, leaving room for a suitable refractory electric insulating material 29. For convenience in assembling, the enclosure 28 is open at one side and a strip 30 is inserted in the assembly at the proper time but after the ends of the resister are made fast to the bolts 26 and 27 and the bolts properly insulated and made fast to strip 30.

Thus we have described a conventional electric heating element. In order to increase the radiating surface of this element as hereinbefore described, we provide a supplemental strip 31 which fills the space between the edges of enclosure 28 and is the same thickness as this enclosure, therefore, providing a smooth metal surface on the open side of the enclosure and in direct contact with strip 30. Thus the enclosure now presents a suitable heat conducting, rectangular shaped tube upon which we mount our radiating fins as follows:

The fins 35 are rectangular in shape as shown in Fig. 5 and are provided with flanges 36 which are slightly longer than the assembled distance between the fins. When the flanges are formed there is left a round surface as at 37. When the fins are pressed on the enclosure, the flange ends press into this opening formed by the curved surface 37, therefore, the edges are pressed tightly under the fins and into the enclosure, thus forming a spacer for the fins and a reinforced continuous heat conducting flange which tightly embraces the enclosure and is an intimate part of the fins.

Referring now specifically to Figs. 1 and 2, the heating elements are suitably connected by wires as will hereinafter appear. We provide a junction box 38 which is positioned preferably in the lower left hand rear corner of the unit. In this junction box proper connections are made to the elements, thermal control switch and the motor 4. Binding posts are provided for the wires which lead to the main line switch and remote control switches in a manner which will hereinafter appear.

Thus it will be seen that we have provided a neat, compact and simple electric heating unit, having a very large radiating surface which is brought in intimate contact with all of the air that passes through the unit.

Referring now to Figs. 7 and 8 wherein the preferred plan of wiring and control switches are shown: The main control switches are designated in their entirety by the reference characters B and C. These control switches consist of a magnet coil 40, contact points 41, contact arm 42 which is pivoted as at 43 and having an extension and weight 44, whereby the switch is normally held open. Means are provided on these switches whereby they will be closed magnetically when the coil 40 is energized in a manner which will act to hereinafter appear.

The simplest form of our invention is shown in Fig. 7. As illustrated, the resister 25 of elements A is connected at one end to switch B at 41 by means of wire 51. The other end is attached to main line switch D by means of wire 52 as indicated. Pivot 43 of switch B is attached to main line switch D by means of wire 53 as indicated. Thus when the main line switch D and switch B are closed, the resister 25 and motor 4 will be operatively connected to the main line and will operate to heat the air forced through the unit by the fan motor 4. The fan motor 4 is operatively connected to wires 51 and 52 as indicated, whereby the motor 4 will be operated when the control switch is closed.

In order to insure against overheating the resister 25 and its heat radiating enclosures, in case the fan motor 4 should fail to operate, a thermal control switch 54 is provided and positioned in the unit 1 near the heating elements. (See Figs. 1 and 2.) This thermal switch 54 is set to normally hold the circuit formed by wires 55 and 56 closed. Wire 55 is connected to one terminal of 54 and the other terminal of 54 is connected to wire 52 by means of wire 56. Wire 55 is connected to one terminal of the magnet coil 40 and the other terminal of coil 40 is operatively connected to wire 53, as indicated, the wire 55 having a control switch 57 and thermal control switch 58 in series therewith. 58 is adapted to normally hold the circuit line 55 closed. As thus illustrated when the main line switch D and switch 57 are closed, a closed circuit is established between the main supply wires 52 and 53 through the coil 40 which will then act to close the switch B and the fan motor 4 will operate and the register 25 will heat the circulated air.

Thermal control switch 58 is suitably positioned in the room to be heated and the switch 57 positioned in a convenient place for manual control. When the temperature of the room reaches a predetermined point the thermal switch 58 will be opened in a manner which is well known and the coil 40 disconnected and the weight 44 will then act to open switch B to thereby disconnect the motor 4 and resister 25. However, after the room temperature falls to a predetermined point the circuit in 58 will be closed and switch B will again be closed, thus to re-establish the connection to the resister 25 and motor 4.

In this system as illustrated, if for any reason the fan 4 should fail to operate, the resister 25 would become overheated. However, the thermal switch 54 would then operate to open circuit 55 and thereby disconnect the resister and protect it from injury in the same manner as if the circuit 55 were broken by thermal control switch 58 or by opening switch 57. Thermal control switch 54 is preferably of the metal fuse type and as is well known would require manual attention to reconnect the circuit.

Thus it will be seen that our improved system is automatically controlled either by the room temperature or by excessive heat in the unit, and that we have provided for remote manual control through the switch 57, and since there are but three wires leading to the unit 1, viz, wires 53, 52 and 55, a simple device adaptable to the various requirements is provided.

In systems of this type it is frequently desirable to provide a high and low heat control. For example, in order to be more suitable for moderate weather or extremely cold temperatures, the design shown in Fig. 8 is adapted to meet this requirement.

In Fig. 7 the resister 25 is shown as in one series. It will be understood, however, that 25 represents the resisters in elements A as connected together in series. Fig. 8 will be understood to represent the resisters in elements A as connected in series multiple, that is, each series would consist of six elements connected in series and that these two series would be connected in multiple. Thus the resisters in the twelve elements A illustrated in Fig. 1, are illustrated in Fig. 8 as having two groups of six resisters in series connection, one group represented by the numeral 25 and the other by numeral 60.

In Fig. 8 the resister 25 is shown as being connected to the various switches exactly as shown in Fig. 7 and the operation of this resister 25, motor 4 and all of the switches and connections thereto which bear the same symbol would, of course, act to operate as explained in connection with Fig. 7.

The high heat resister 60 is connected at one end to wire 52 and at the other end to contact point 41 of switch C by means of wire 61. The coil 40 in switch C is connected from one terminal to wire 53 as in Fig. 7, and at the other terminal a connection is made by means of wire 62 and switch 63 to thermal control switch 58 as at 64, thus the resister 60 cannot be operated except when switch 57 is closed and then only when high heat manual control switch 63 has been closed. However, thermal control switches 54 and 58 would operate to disengage switch C in the same manner as switch B.

It will be understood that thermal control switch 54 is suitably positioned whereby it will be influenced by the heat from either resister 25 or 60, thus to protect both from injury as and in a manner herebefore described.

In the design shown in Fig. 8, we wish it understood that any number of elements may be connected in series. Unit 1 is shown as equipped with twelve elements, therefore, resister 25 will include six elements in series connection, and resister 60 will be understood to consist of the six other elements connected in series. The elements A of each group are, however, preferably positioned in alternate relation, that is, every other element of the row of elements across the opening in the housing 1 will be in series connection and adapted to be operated by means of control switch B and the other alternate elements will be connected in series and adapted to be operatively connected to switch C. In any event, the motor 4 will be directly connected as indicated in Figs. 7 and 8 to wires 51 and 52, whereby the motor 4 will operate when the elements are in operation.

The object of spacing the elements of the two groups alternately is, when as in the design shown in Fig. 8, the operating switch B only is closed for low heat or moderate weather, the heating of the air current by deflection will be more uniform and efficient than if the heated elements were all grouped on one side of the unit 1.

Fig. 9 illustrates an arrangement of elements or resisters suitable for use in combination with the circuits and switches shown in Fig. 8. Therefore, the wires leading to the resister terminals are designated by similar reference numerals. Six resisters are shown as connected in two groups and positioned in alternate relation.

Wire 52 leads to a common terminal 70 to which one end of each resister 71 and 72 is connected. Resisters 71 are in series and terminate in a connection to wire 51. Resisters 72 are in series and terminate in a connection to wire 61.

With this arrangement of resisters, unit 1 would be equipped with six resisters or elements A consisting of two groups of three elements each and positioned in alternate relation across the airway of unit 1.

Fig. 10 illustrates a modification wherein the elements or resisters are in two groups and suitably connected directly to a manually controlled switch whereby high and low heat may be secured by connecting the two groups either in multiple or series. The elements are preferably positioned in alternate relation for the purpose herebefore explained. As illustrated E designates the high and low heat switch in its entirety.

All parts in Fig. 10 which are similar to parts in Figs. 7 and 8 are designated by similar reference characters.

Wire 73 connects one pole of switch D to a terminal of resister 74 as at 75. Wire 76 connects one terminal of thermal switch 54 to wire 73 as at 75. The other terminal of switch 54 is connected to control switch coil 40 by means of wire 55. Thermal switch 58 and switch 57 are in series connection with wire 55 as illustrated. Coil 40 is at its other terminal connected to wire 53 at 43. As thus shown and described it will be seen that when switches D and 57 are closed, coil 40 will be energized and will act to close switch F in a manner herebefore described.

Switch E is a special design wherein bars 79 and 87 swing sidewise to thereby contact points 77 and 86 alternately. The switch bars are shown as moved to the right; thus connecting the elements 74 and 80 in series for low heat as follows: the circuit will be from contact point 41 to point 77 by means of wire 78 and bar 79 thence to resister 80 as at 81.

Resisters 74 and 80 have a common terminal as at 82; thus as indicated the resisters will be in series connection for low heat.

The motor 4 having one terminal connected to wire 73 by means of wire 83 and a connection from its other terminal to wire 78 by means of wire 84, thus the system will operate to heat the circulated air and be controlled automatically or manually as in Figs. 7 and 8.

It will be observed that when the bars 79 and 87 are moved to the left or as shown by dotted lines, wire 73 will be connected to resisters 74 as at 75 and to resisters 80 as at 81 by means of the switch bar 87 and wire 91. Wire 53 will be connected to the common terminal 82 by means of wire 90. Thus the resisters 74 and 80 will be connected to the main line switch D in multiple for high heat.

It will be seen that we have provided a simple and economical electric controlling device and heating unit which may be easily adjusted for low and high heat and that while in operation the room temperature will be automatically regulated, the elements will be automatically protected from over heating by a thermal switch and the device can be thrown in or out of operation by remote manual control.

Obviously, many detail changes in the manner of connecting the elements, control devices and various detail changes in the elements and the mounting thereof, can be made without departing from the spirit of our invention.

What we claim and desire to secure by Letters Patent is:

1. An electric heating unit, comprising a housing an electric fan mounted on said housing, and adapted to force an air current therethrough, heating units spaced apart in a transverse row and positioned in the path of said air current, said units comprising metal container tubes, rectangular in cross section, having a multiplicity of flanged fins through which said containers extend, resisters in said containers, and heat conducting means adapted to insulate said resister therefrom, suitable connections between said resisters and said fan whereby said resister will operate only when said fan is in operation, said heating units positioned with their narrow sides transverse to the normal direction of air flow the fin edges in juxtaposition to the adjacent fins.

2. An electric heating unit, comprising a housing, an electric fan supported thereby and adapted to force an air current therethrough, a number of rectangular resister holding tubes, a multiplicity of rectangular fins with flanged openings through which said tubes extend, said tubes positioned in a transverse row in said housing the flat sides adjacent each other and the fin edges in juxtaposition with the adjacent fins, said resisters and fan connected to thereby operate simultaneously, a thermal electric switch positioned adjacent one of said tubes and adapted to normally remain closed and to open permanently when subjected to an abnormal temperature, suitable electrical connections and means whereby said resisters and fan will be permitted to operate only when said thermal switch is closed.

3. An electric heating device, comprising a housing, an electric fan attached thereto and adapted to force air therethrough, a number of individual air heating resisters positioned in a transverse row in said housing across the path of the circulated air, said resisters having connections to thereby form two circuits, the resisters of one circuit positioned in said row alternately with the resisters of the other circuit, means whereby said circuits may be connected in multiple to the source of electrical supply and means whereby one circuit may be disconnected leaving alternate resisters in operation.

4. An electric heating device, comprising a housing, an electric fan mounted thereon and adapted to force an air current therethrough, primary and secondary heating units each comprising a number of spaced apart containers positioned in a row across the path of said air current, the resisters of said containers having series connections and a common multiple connection at one end, a thermo-electric switch having a connection to said common connection and a manually controlled switch in series therewith, a primary electrically operated switch and a secondary electrically operated switch, each having a connection to the end of one of said resisters on the opposite end to said common connection, a connection between said thermal switch and said primary switch, a secondary manually controlled switch having a connection from said thermal switch to said secondary switch, instrumentalities whereby said primary unit may be connected for operation or disconnected by either said thermal or primary manually operated switch, and said secondary unit may be connected for operation or disconnected by said thermal switch or said secondary manually controlled switch, said fan having connections to said common connection and said primary unit, thereby to operate when both primary and secondary units are operating or when said primary unit is operating.

5. An electric heating device, comprising an air heating resister and an electric fan operatively connected thereto, a main line switch having a high resistance closing coil and means to normally be held open, suitable connections whereby said resister and fan will be operated when said main line switch is closed, a thermal electric switch positioned adjacent said resister adapted to normally remain closed and to open when its temperature rises above a predetermined point, a manually controlled switch, suitable wire connections in multiple with the source of electric supply, having said thermal switch, manually controlled switch, and closing coil in series therewith whereby when said thermal and manually controlled switches are each closed, said closing coil will operate to close said main line switch, and whereby when either said thermal or manually controlled switch is opened, said coil will permit said main line switch to open.

6. An electric air heating device, comprising a housing, heating elements positioned in a row across the front of said housing, an electric fan mounted on said housing and operatively connected to said elements, a main circuit switch having means to normally remain open, having a closing coil, a manually controlled switch having a series connection with said closing coil and operatively connected to the source of electrical supply, suitable connections whereby said elements and fan will operate only when said main circuit switch is closed, said coil adapted to close said main circuit switch when said manually operated switch is closed, and permit said main circuit switch to open when said manually controlled switch is open.

7. An electric heating device, comprising a housing, heating elements positioned in a transverse row in said housing, an electric fan mounted on said housing and operatively connected to said elements, a main line switch having a closing coil and means to be normally held open, suitable connections whereby said resister and fan will be operated when said main line switch is closed, a thermostat adapted to open or close its switch when subjected to a temperature above or below a predetermined point and a manually controlled switch, a suitable electric circuit having a multiple connection to the source of electric supply, having said thermostat switch and manually controlled switch and said closing coil in series therewith, whereby said main line switch will be held closed by said closing coil when each of the switches in said multiple circuit are closed and whereby said closing coil will permit said main line switch to open when either switch on said multiple circuit is open.

8. An electric heating device, comprising a housing, an electric fan mounted thereon and adapted to force air therethrough, a number of heating elements positioned in a transverse row in said housing, comprising suitable connections to thereby form two circuits, a main line switch having a closing coil and means to normally remain open, a manually controlled switch between said main line switch and said resisters having means to thereby connect said resisters in series or in multiple, said fan having suitable connections to thereby operate simultaneously with said resisters, a manually controlled switch having a series connection with said closing coil to the source of electrical supply whereby when said manually controlled switch is closed, said closing coil will operate to close said main line switch and whereby when said manually controlled switch is open, said closing coil will permit said main line switch to open.

FRED M. YOUNG.
ERNST WITZEL.